UNITED STATES PATENT OFFICE.

ALBERT ALLEN MARTINEZ, OF NEW ORLEANS, LOUISIANA.

LUBRICATING COMPOSITION.

SPECIFICATION forming part of Letters Patent No. 326,311, dated September 15, 1885.

Application filed June 24, 1885. (No specimens.)

*To all whom it may concern:*

Be it known that I, ALBERT ALLEN MARTINEZ, of New Orleans, in the parish of Orleans and State of Louisiana, have invented a new and Improved Lubricating Composition, of which the following is a full, clear, and exact description.

My composition consists of the following ingredients to each fifty gallons of oil, to wit: one (1) pound Central American scrap rubber or caoutchouc, one (1) pound ground alum, one (1) pound plumbago, and one (1) pound rosin-soap.

The above-named ingredients are placed in an earthen jar containing ten gallons of crude or refined black oil, rock-oil, or coal-oil. The jar containing this oil and the ingredients named is placed in a kettle partly filled with water, care being taken to place bars of proper material beneath the jar, so that it will not come in contact with the direct heat of the fire over which the kettle is placed, which fire should be a slow but hot one. The kettle is allowed to remain on the fire until the temperature of the oil has been raised to from 200° to 350° Fahrenheit, or until the oil and ingredients have been sufficiently boiled, which point may be ascertained by placing a few drops of the mixture in a glass of cool or cold water, and when cold put the mixture on a piece of heavy card-board, which is then lighted, and if the oil runs from the flame the mixture will be in condition to be removed from the fire. This is only one of many ways of testing the oil.

After the contents of the jar have stood the required test the jar is taken out and set to cool, and as soon as thoroughly cooled the mixture is put into a tank containing forty gallons of oil and thoroughly mixed by agitation, either by shaking, stirring, or otherwise. The oil is now allowed to stand for about forty-eight hours, when it is again mixed by thorough agitation and left to stand for about twenty-four hours. The oil is now drawn off through a small sieve or netting, so as to remove all grit or solid material. The lubricating-oil will now be ready for use, and it will be found to possess qualities that will enable it to resist the action of a very high degree of heat. This oil is a great improvement upon the lubricating-oils now in use.

Having thus described my invention, I claim as new and desire to secure by Letters Patent—

1. The herein described composition of matter to be used in connection with oil for lubricating purposes, consisting of Central American scrap rubber or caoutchouc, alum, plumbago, and rosin-soap in the proportions substantially as specified.

2. The herein described composition of matter to be used for lubricating machinery, consisting of caoutchouc, alum, plumbago, and rosin-soap in the proportions substantially as specified, combined and mixed with oil substantially in the proportions and manner described.

ALBERT ALLEN MARTINEZ.

Witnesses:
 ANDREW HEW, Jr,
 HENRY GOVAN.